May 20, 1924.
W. A. COLBURN
VALVE
Filed April 28, 1922    2 Sheets-Sheet 1
1,494,890
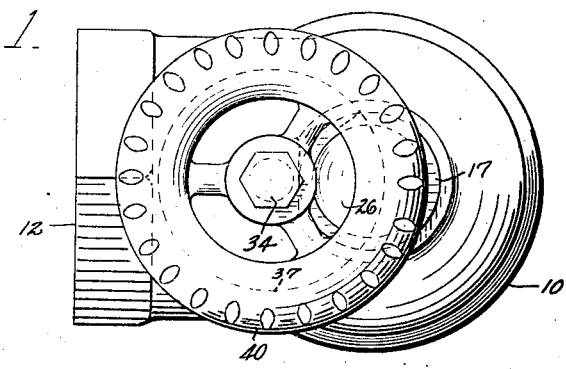
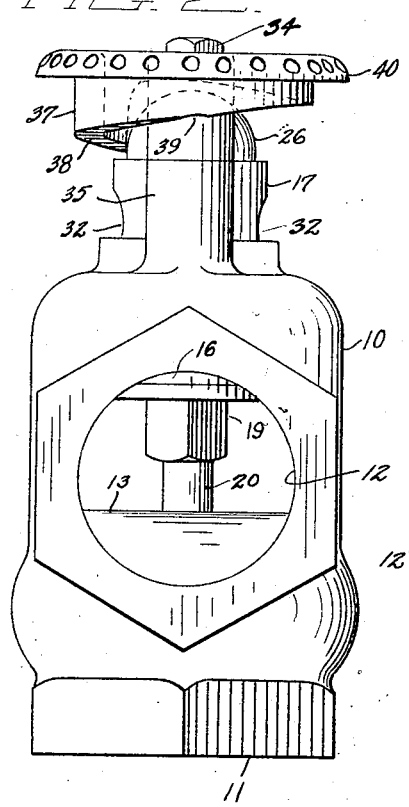
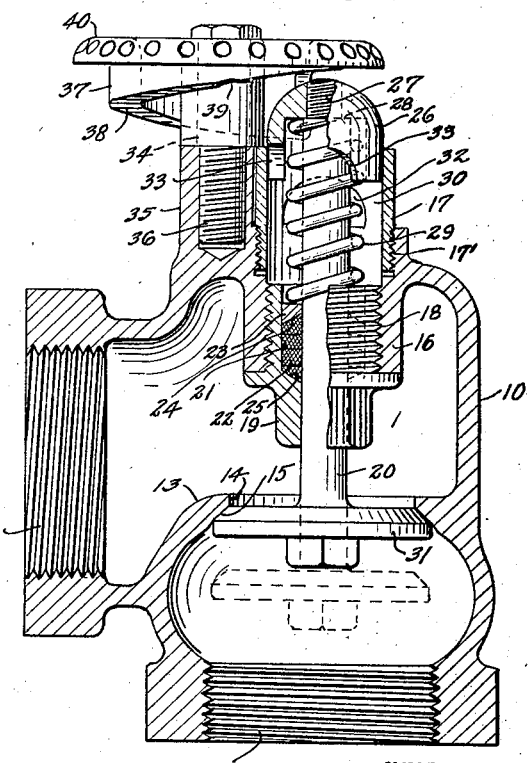
INVENTOR.
Walter A. Colburn
BY Wooster & Davis
ATTORNEYS.

May 20, 1924.
W. A. COLBURN
VALVE
Filed April 28 1922  2 Sheets-Sheet 2
1,494,890
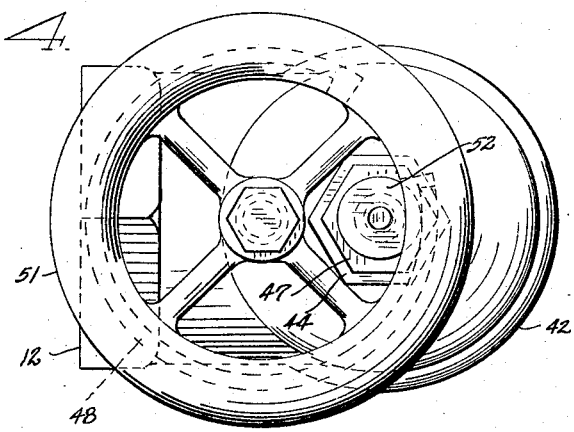
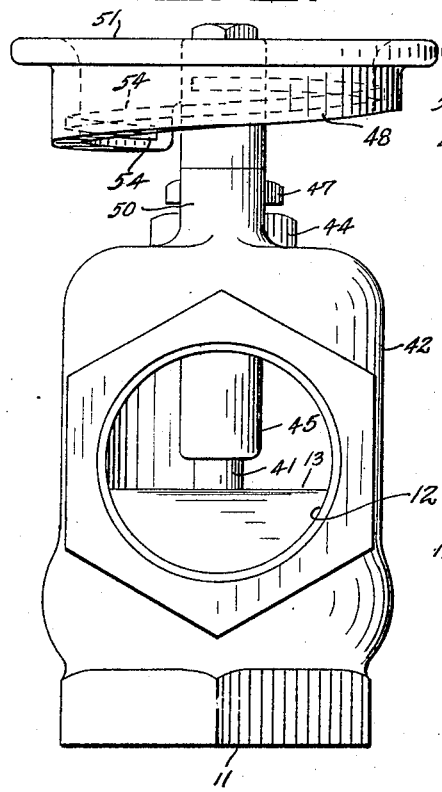
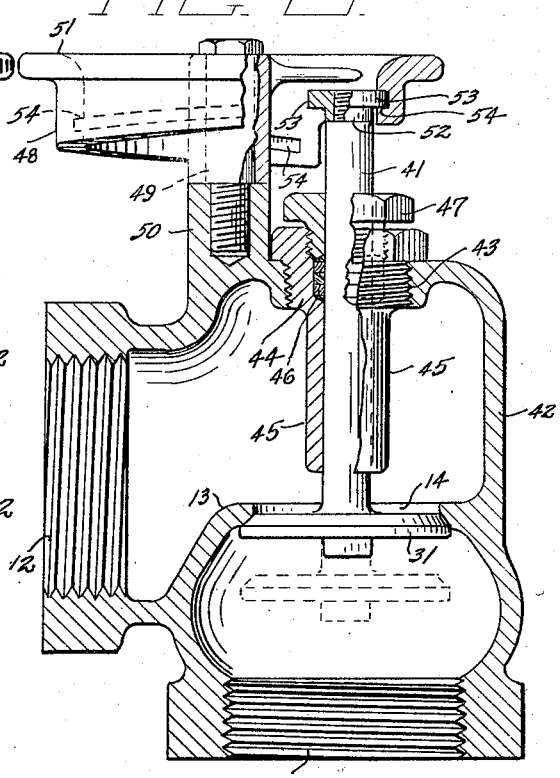
INVENTOR.
Walter A. Colburn
BY Wooster & Davis
ATTORNEYS.

Patented May 20, 1924.

1,494,890

UNITED STATES PATENT OFFICE.

WALTER A. COLBURN, OF BRIDGEPORT, CONNECTICUT.

VALVE.

Application filed April 28, 1922. Serial No. 557,038.

*To all whom it may concern:*

Be it known that I, WALTER A. COLBURN, a citizen of the United States, residing at Bridgeport, county of Fairfield, State of Connecticut, have invented an Improvement in Valves, of which the following is a specification.

This invention relates to valves and has for an object to provide a valve structure which will occupy less space for a given size of valve than those now generally in use.

It is a further object of the invention to provide a valve structure in which the amount of material required for a given size of valve will be reduced to a minimum to reduce the cost of the same.

It is a still further object of the invention to provide a valve structure in which the machining necessary is reduced and in which such surfaces, as do require machining, are accessible and so easily operated upon.

With these and other objects in view I have devised the structure illustrated in the accompanying drawings, in which—

Fig. 1 is a top plan view of my valve assembled.

Fig. 2 is a rear elevation thereof.

Fig. 3 is a longitudinal central sectional elevation taken at right angles to Fig. 2.

Fig. 4 is a top plan view of a modified construction.

Fig. 5 is a rear elevation of this modified construction, and

Fig. 6 is a substantial central sectional elevation taken on a plane substantially at right angles to Fig. 5.

I have shown my improved valve construction as applied to a right angle valve as adapted for use on heating radiators, but is, of course, adapted for use in other types of valves. In the form shown in Figs. 1 to 3, 10 represents the body of the valve provided with the usual inlet 11 and outlet 12. Extending across the chamber in the body is a partition 13 having an opening 14 therethrough and provided on its lower side with a tapered valve seat 15, or any other form of seat desired, in alignment with the inlet 11. In the top of the body member are substantially cylindrical walls 16 and 17 extending inwardly and outwardly respectively, the walls 16 being preferably integral with the casing 10 and internally threaded at 18 in which is threaded the guiding member 19 to receive the valve stem 20, which is adapted to reciprocate in this member. The outwardly extending cylindrical portion 17 is preferably detachably secured to the body 10 by suitable means, such as the screw threads 17', so as to facilitate repacking of the valve stem. The upper portion 21 of the passage through the member 16 is enlarged to provide a space for a packing 22 and a follower 23. The opposed end walls of the follower and the enlarged portion of the passage 24 and 25 respectively are tapered as shown to diverge toward the valve stem. The follower has sliding engagement with the enlarged portion of the passage. The interior of the wall 17 is finished to provide a guiding means for the head 26 secured to the end of the valve stem by any suitable means, such as screw threads 27, there being a suitable shoulder 28 to limit the movement of this head on the valve stem. Surrounding the valve stem and bearing on its opposite ends on the follower 23 and within the head 26 is a coil spring 29 located in the chamber 30 within the wall 17. As the valve disc 31 carried by the valve stem is below the partition 13, it will be apparent the spring tends to hold the valve in closed position and it also presses the follower 23 against the packing 22. The inclined walls 24 and 25 tend to force the packing against the valve stem, thus providing at all times a tight contact therewith and preventing leakage about the valve stem. As the valve opens toward the inlet, the pressure of the fluid also tends to hold the valve in closed position. The walls 17 are provided with one or more ventilating openings 32 to allow access of air to the spring to prevent overheating of the same. In order to prevent closing of these openings by the sides of the head 26 when the valve stem is depressed, this head is provided in the side walls thereof with suitable recesses 33 in alignment with the ventilating openings.

I provide improved means for operating the valve which is both simple and quick acting and also does not require as much space as the operating means now generally employed. Spaced laterally of the valve stem, preferably between this stem and the outlet 12 as shown, is mounted a pivot stud 34 by threading the same into a boss 35 on the body as shown at 36, the stud also having a cylindrical bearing surface upon which the cam element 37 is rotatably mounted. This cam element is preferably a portion of a cylinder with its lower end inclined as shown to form the cam surface 38 adapted to coact with the upper end of the valve stem or the head 26 to push the valve stem downwardly and open the valve when the cam element is rotated to the left or counterclockwise, as shown in Fig. 1. Spaced suitable distances apart on this cam surface, preferably corresponding to a movement of the cam which will move the valve one-quarter of its total movement, I provide shallow recesses 39 so that, when the cam is turned a partial revolution, the end of the valve stem will indicate to the operator as it enters one of these recesses the position of the valve. The recess will also retain the cam element against turning under the action of the spring to close the valve, and will allow the valve to be left in any one of several positions. Any suitable means may be provided for rotating the cam element, such as a hand wheel 40.

In the modified form shown in Figs. 4, 5, and 6, the valve stem 41 is mounted in a somewhat different manner. The top of the body member 42 is provided with a threaded opening 43 in alignment with the valve opening 14 in the partition 13 and into this opening is threaded a guide sleeve 44. This sleeve may be extended down to a point adjacent the partition 13, as shown at 45, to give an extended bearing for the valve stem. The upper end of the sleeve is provided with an enlargement to receive a suitable packing 46 and is threaded for a follower 47 adapted to press the packing against the valve stem, as is well known. The cam element 48 is preferably a portion of a cylinder, the same as shown in Figs. 1, 2, and 3, and is mounted to rotate on a pivot stud 49 threaded in a boss 50 on the casing spaced laterally to one side of the valve stem, preferably between this stem and the outlet 12, the same as in the preferred form. This cam element is also rotated by any suitable means, such as the hand wheel 51. However, as the spring used in the first form to return the valve to closed position is omitted, this cam is so formed and connected with the valve stem as to positively move it to both open and closed position, though in operation its movement to closed position will be assisted by the pressure of the fluid on the valve. I preferably connect the valve stem to the cam by means of a cap element 52 threaded on the end of the valve stem and provided with a flange 53. This flange is adapted to seat in a spiral cam groove 54 formed on the inner wall of the cylindrical cam element 48. It will be obvious that, as the cam element is rotated, the flange 53 will follow the groove and reciprocate the valve.

By my arrangement and construction of the elements the height of the valve is greatly reduced over that of valves of the same size now generally in use, and the amount of material required together with the amount of machining is also reduced. By locating the cam element and the hand wheel at one side of the axis of the valve stem and especially between this stem and the radiator, this hand wheel does not project out where it is in the way or where it is liable to become injured, and it, besides, presents a very neat appearance.

Having thus described the nature of my invention, what I claim is:

1. In a valve, a body member, a guide in the body member, a valve stem mounted to reciprocate therein, said body being provided with guide walls surrounding said stem and spaced therefrom, a head carried by the stem and guided by said guide walls, a spring around the stem and between the stem and said guide walls and reacting against said head carried by the stem and the guide in the body member to move the valve stem in one direction, and means for moving the valve stem in the opposite direction, said guide walls being provided with one or more ventilating openings leading to the space occupied by said spring.

2. In a radiator valve, a body member, a guide in said member, a valve having a stem mounted to reciprocate in said guide, said body being provided with guide walls surrounding said stem and spaced therefrom, a head carried by the stem and guided by said guide walls and projecting from the casing, a spring around the stem between the stem and said guide walls and reacting against said head carried by the stem and the guide for the stem to move the valve to closed position, a cam mounted to rotate on an axis spaced laterally of the valve stem and substantially parallel therewith, said cam engaging said projecting head to reciprocate the valve against the action of the spring, and means for rotating the cam.

3. In a radiator valve, a body member provided with inlet and outlet openings and a transverse partition between said openings provided with a valve seat, a guide member removably mounted in the casing above said partition, a valve adapted to coact with said seat and provided with a stem guided in said guide member, a head on said stem above said member and projecting from the casing, said body being provided with guide walls about the stem for said head carried by the stem, a spring about the stem reacting against the head carried by the stem and the guide member tending to move the valve to closed position, a cam mounted to rotate on an axis spaced laterally of the valve stem and substantially parallel therewith, said cam engaging said projecting head to reciprocate the valve against the action of the spring, and means for rotating the cam.

4. In a radiator valve, a body member, a guide in said member, a valve having a stem mounted to reciprocate in said guide, said body being provided with guide walls surrounding said stem and spaced therefrom, a head carried by the stem and guided by said guide walls and projecting from the casing, a spring around the stem between the stem and said guide walls and reacting against said head carried by the stem and the guide for the stem to move the valve to closed position, a cam mounted to rotate on an axis spaced laterally of the valve stem and substantially parallel therewith, said cam engaging said projecting head to reciprocate the valve against the action of the spring and provided with one or more recesses to coact with the head to provide means to retain the cam against turning under the action of the spring, and means for rotating the cam.

5. In a radiator valve, a body member provided with inlet and outlet openings and a transverse partition between said openings provided with a valve seat, a valve cooperating with said seat and provided with a stem, a guide member removably mounted in the casing above said partition and projecting into the casing toward said partition to provide a guide for said stem, a packing and a follower therefor about said stem carried by the guide member, a cam mounted to rotate on an axis intermediate the outlet opening and the valve stem and substantially parallel with the stem, a member carried by said stem projecting from the casing to coact with said cam, and means for rotating the cam.

6. In a radiator valve, a body member having a side opening adapted to be connected to a radiator, a valve stem mounted to reciprocate in said body member, a valve connected with said stem, a cam element mounted to rotate about an axis located between the said side opening and the axis of the valve stem, means carried by the stem coacting with the cam element whereby the valve is reciprocated on rotation of the cam, and means for rotating the cam element.

7. In a radiator valve, a body member having a side opening adapted to be connected to a radiator, a valve stem mounted to reciprocate in said body member, a valve connected with said stem, a cam element mounted to rotate about an axis located between the said side opening and the axis of the valve stem, said cam element having a cam surface adapted to coact with the valve stem to move it in one direction, said cam surface having spaced recesses therein to provide stops for different locations of the valve, and a spring tending to move the valve stem in the opposite direction.

In testimony whereof I affix my signature.

WALTER A. COLBURN.